Figures 1, 2:
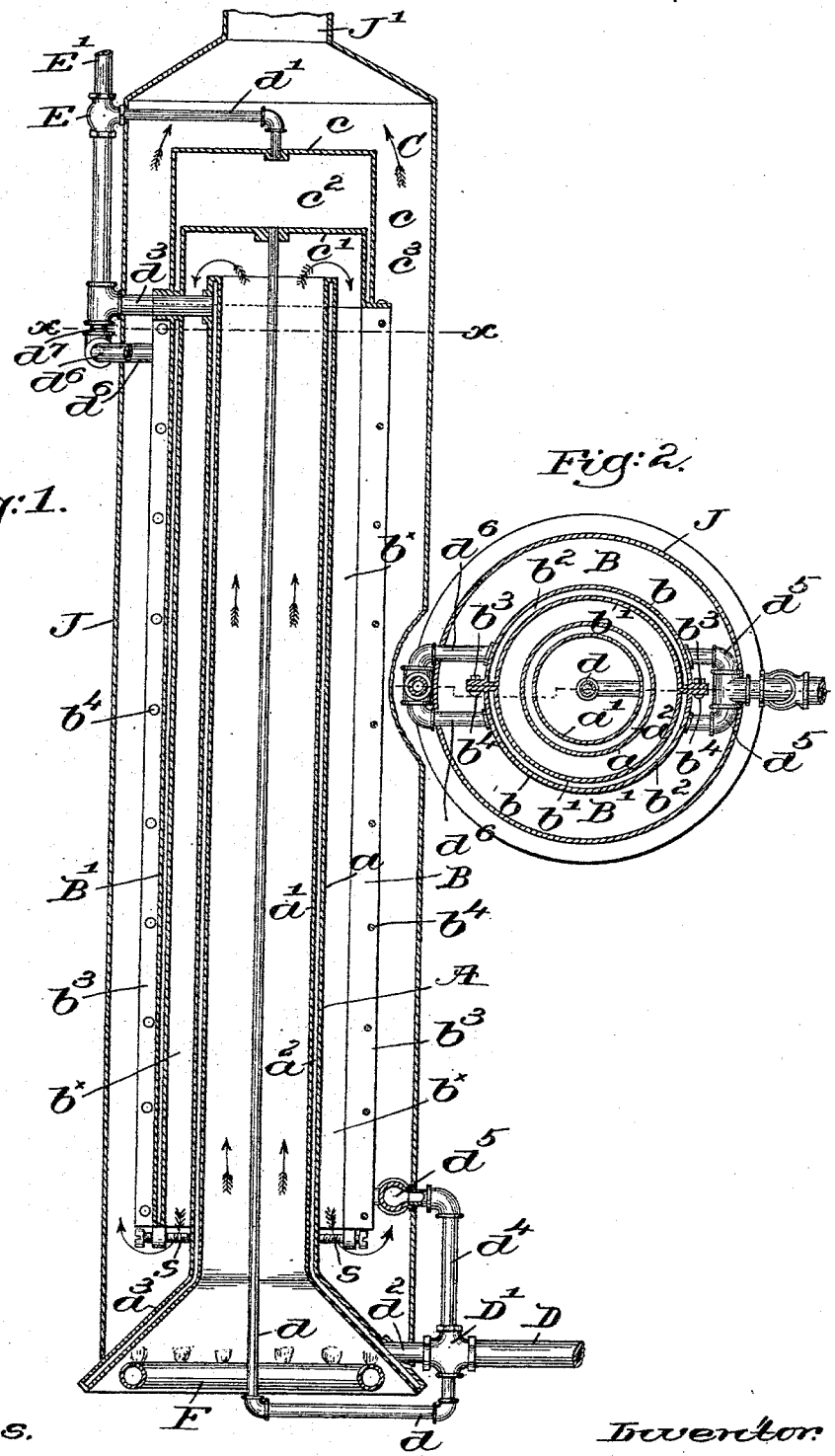

(No Model.)

J. C. NORTON.
HOT WATER HEATING APPARATUS.

No. 516,061. Patented Mar. 6, 1894.

Witnesses.
Louis N. Gowell
Edward F. Allen

Inventor:
Joseph C. Norton,
by Crosby & Gregory, Att'ys.

UNITED STATES PATENT OFFICE.

JOSEPH C. NORTON, OF LYNN, MASSACHUSETTS.

HOT-WATER HEATING APPARATUS.

SPECIFICATION forming part of Letters Patent No. 516,061, dated March 6, 1894.

Application filed May 2, 1893. Serial No. 472,693. (No model.)

*To all whom it may concern:*

Be it known that I, JOSEPH C. NORTON, of Lynn, county of Essex, State of Massachusetts, have invented an Improvement in Hot-Water Heating Apparatus, of which the following description, in connection with the accompanying drawings, is a specification, like letters on the drawings representing like parts.

This invention has for its object to provide a simple, compact and efficient apparatus for raising the temperature of water or other liquid, and the invention consists in a novel arrangement and combination of annular thin reservoirs through and about which are passed the products of combustion from a suitable heater.

The drawing Figure 1, represents in vertical section one form of apparatus embodying this invention; and Fig. 2 a cross section on the irregular dotted line $x$—$x$.

Referring to the drawings, A, represents an annular or tubular thin water reservoir consisting of two concentric tubes $a$, $a'$, between which is an annular thin water space $a^2$, said reservoir being open both top and bottom, as shown, and at its bottom preferably made flaring, as at $a^3$ to present a bell-shaped mouth. Embracing this inner reservoir A, and surrounding the same like a skirt are the two semi-circular reservoirs B, B', see Fig. 2, each of which consists of two concentric walls $b$, $b'$ separated to leave a thin water space $b^2$, each section being closed at its sides, top and bottom, to form complete reservoirs, the two semi-circular sections being provided with flanges $b^3$ by which the two sections are drawn together by bolts $b^4$ to form in effect a single skirt-like annular reservoir surrounding the inner reservoir A and separated therefrom to leave a space $b^\times$.

To the upper closed ends of the outer reservoirs B, B', is secured the top section C, consisting of an outer shell $c$, and an inner shell $c'$ separated to leave a large water space $c^2$ over the inner reservoir A, and closing the top of the outer reservoirs B, B', and a smaller annular water space $c^3$ extending down the sides toward and in line with the water spaces in the sections B, B'.

D is the water supply pipe, constituting, it may be, the return of a water system, it being shown as entering a manifold D' from the bottom of which leads a branch $d$ which drops sufficiently to clear the bell mouth of the inner reservoir and then rises within the said inner reservoir to and enters the water space $c^2$ in the top section C. An outlet pipe $d'$ leaves the said water space $c^2$ at its top and joins the manifold E on the end of the circulation pipe E'. A second branch $d^2$ from the manifold D' enters the inner reservoir A, an outlet pipe $d^3$ leading from the latter at its top and joining the manifold E, as shown, said outlet pipe passing through an opening left for it in the outer skirt at the junction of the three sections B, B' and C. A third branch $d^4$ from the manifold D' is divided again into two branches $d^5$, one of which enters each of the sections B, B' of the outer skirt, the outlet pipes $d^6$ from the said sections joining a common pipe $d^7$ leading to the manifold E. It will thus be seen that water entering the manifold D' circulates freely through the inner and outer reservoirs and through the central pipe $d$ and its top section or reservoir C.

As a means for heating the water or liquid circulating through the apparatus, I prefer to employ a heater consisting of a circular perforated pipe F, into which is conducted gas, oil, or other suitable fuel, though I desire it to be understood that any other means may be used if found more desirable. A shell J surrounds the reservoirs and, as herein shown, rests upon the edge of the flaring mouth $a^3$, said shell being drawn in or made smaller at its top and leading to an outlet J', it inclosing the entire apparatus except some of the pipes. The products of combustion from the heater F are collected by the mouth $a^3$ and pass upwardly within the inner reservoir A and about the pipe $d$ therein, until they reach the top of the said reservoir, whence they are conducted down outside the inner reservoir in the space $b^\times$ between it and the outer skirt to and out the bottom of the latter and escape through the space between it and the shell to the outlet J'. The water being held in very thin sheets or films in the reservoirs is quickly heated and a rapid and strong circulation is established.

The skirt reservoir B, B' is maintained in proper position surrounding the reservoir A by means of spacing devices or screws s.

This invention is not limited to the exact construction herein shown, for it is clear the same may be varied in its construction in many ways without departing from the spirit and scope of the invention.

The number of annular reservoirs may be varied as desired, and they may be formed of separate sections as B and B' bolted together, or in a single section, as the reservoir A, as is most convenient.

I claim—

1. In a hot water heating apparatus the combination of the following instrumentalities, viz:—a plurality of concentrically arranged annular thin water reservoirs separated to leave annular spaces through which in succession the products of combustion are conducted, water inlets for and at the bottoms of said annular reservoirs and water outlets for and at the tops of said reservoirs leading to a common outlet pipe, a shell surrounding the outermost reservoir and separated therefrom to leave an outer annular space, a heater arranged beneath the innermost of said reservoirs, the products of combustion from said heater passing upwardly first through and within the innermost reservoir, thereafter through the several annular passages in succession and finally rising through the outer annular space within the shell and outside of and surrounding the outermost water reservoir whereby the water reservoirs are at all times surrounded and heated by products of combustion and a continuous upward flow of water had in the several reservoirs from the inlets to the outlets thereof, substantially as described.

2. In a hot water heating apparatus the combination of a heater, a plurality of concentrically arranged annular thin reservoirs separated to leave annular spaces through which the products of combustion are conducted, water inlets and outlets for said reservoirs, and a reservoir arranged over the top of the inner of said reservoirs, a water inlet pipe therefor rising within said inner reservoir, and an outlet therefor, substantially as described.

3. In a hot water heating apparatus the combination of a heater, an annular thin water reservoir arranged vertically above the same and having an outlet at its upper end for the escape of the products of combustion from said heater, and a skirt consisting of independent sections each constituting a reservoir and embracing said annular reservoir and constituting a second annular reservoir surrounding the first, and water inlets and outlets for said reservoirs, substantially as described.

4. In a hot water heating apparatus the combination of a heater, an annular thin water reservoir arranged vertically above the same and having an outlet at its upper end for the escape of the products of combustion from said heater and a skirt consisting of independent sections, each constituting a reservoir and embracing said annular reservoir and constituting a second annular reservoir surrounding the first, a top reservoir resting upon said outer reservoir and over the inner reservoir to cause the products of combustion rising through the latter to be directed downwardly into the space between the two reservoirs, and water inlets and outlets for the said reservoirs, substantially as described.

5. In a hot water heating apparatus, the combination of a heater, the water reservoirs A, B, B' and C, water inlets and and outlets therefor, and the surrounding shell, all arranged and to operate substantially as described.

6. In a hot water heating apparatus the combination of a heater, the water reservoirs A, B, B' and C, water inlets and outlets therefor, the spacing devices s, and the surrounding shell, all substantially as described.

In testimony whereof I have signed my name to this specification in the presence of two subscribing witnesses.

JOSEPH C. NORTON.

Witnesses:
FREDERICK L. EMERY,
JOHN C. EDWARDS.